United States Patent
Dimitrov et al.

(10) Patent No.: US 10,503,456 B2
(45) Date of Patent: *Dec. 10, 2019

(54) METHOD AND APPARATUS FOR RENDERING PERSPECTIVE-CORRECT IMAGES FOR A TILTED MULTI-DISPLAY ENVIRONMENT

(71) Applicant: NVIDIA CORPORATION, Santa Clara, CA (US)

(72) Inventors: Rouslan Dimitrov, Santa Clara, CA (US); Yury Uralsky, San Jose, CA (US); Lars Nordskog, Conte Madera, CA (US); Dmitriy Zhdan, Korolev (RU)

(73) Assignee: Nvidia Corporation, Santa Clara, CA (US)

(*) Notice: Subject to any disclaimer, the term of this patent is extended or adjusted under 35 U.S.C. 154(b) by 132 days.

This patent is subject to a terminal disclaimer.

(21) Appl. No.: 15/652,109

(22) Filed: Jul. 17, 2017

(65) Prior Publication Data

US 2018/0322682 A1  Nov. 8, 2018

Related U.S. Application Data

(60) Provisional application No. 62/502,332, filed on May 5, 2017.

(51) Int. Cl.
*G06F 3/14* (2006.01)
*G06T 15/00* (2011.01)
(Continued)

(52) U.S. Cl.
CPC .......... *G06F 3/1446* (2013.01); *G06F 3/1431* (2013.01); *G06T 15/005* (2013.01);
(Continued)

(58) Field of Classification Search
CPC ..... G06F 3/04815; G06F 3/1446; G09G 5/14; H04N 13/106–117; H04N 13/282;
(Continued)

(56) References Cited

U.S. PATENT DOCUMENTS 5,371,849 A   12/1994   Peaslee et al.
5,598,517 A   1/1997    Watkins
(Continued)

FOREIGN PATENT DOCUMENTS

WO   2000076210   12/2000
WO   2014047841   4/2014

OTHER PUBLICATIONS

Michael Doggett, "Architecting the Future", http://fileadmin.cs.lth.se/cs/Personal/Michael_Doggett/talks/archFuture05-doggett.pdf, Aug. 2, 2005, ATI.

(Continued)

*Primary Examiner* — Patrick F Marinelli

(57) ABSTRACT

Techniques for rendering images on multiple tilted displays concurrently to mitigate perspective distortion are disclosed herein. According to one described approach, viewports are assigned to a center monitor and two peripheral monitors. Scene data for the viewports is calculated, and geometric primitives are generated for the viewports based on the scene data. Image transformation is performed based on a modified perspective value to modify geometry of the geometric primitives based on tilt angles of the displays, and the geometric primitives are rasterized using the modified geometry.

20 Claims, 13 Drawing Sheets

(51) Int. Cl.
*G06T 15/20* (2011.01)
*G09G 5/14* (2006.01)
*G09G 5/395* (2006.01)

(52) U.S. Cl.
CPC ............ *G06T 15/205* (2013.01); *G09G 5/14* (2013.01); *G09G 5/395* (2013.01)

(58) Field of Classification Search
CPC .. H04N 13/349; H04N 13/351; H04N 13/354; H04N 13/307
See application file for complete search history.

(56) References Cited

U.S. PATENT DOCUMENTS

| | | | |
|---|---|---|---|
| 5,986,667 A | 11/1999 | Jevans | |
| 6,690,337 B1* | 2/2004 | Mayer, III | G06F 1/1601 345/1.1 |
| 7,091,926 B2* | 8/2006 | Kulas | G06F 3/1446 345/1.1 |
| 7,453,418 B2 | 11/2008 | Palmquist | |
| 7,865,834 B1* | 1/2011 | van Os | G09G 3/003 348/14.12 |
| 7,904,826 B2* | 3/2011 | Vronay | G06F 3/04815 715/757 |
| 7,973,791 B2* | 7/2011 | Mihara | G06T 15/20 345/426 |
| 8,184,906 B2* | 5/2012 | Chaffey | G06T 3/4038 382/175 |
| 8,289,393 B2 | 10/2012 | Okada et al. | |
| 8,350,862 B2 | 1/2013 | Noyle et al. | |
| 8,866,871 B2 | 10/2014 | Xiao et al. | |
| 8,976,224 B2 | 3/2015 | Smith et al. | |
| 8,988,343 B2 | 3/2015 | Fei et al. | |
| 9,009,984 B2* | 4/2015 | Caskey | G06F 1/1616 33/303 |
| 9,292,962 B2* | 3/2016 | Vesely | G06T 15/20 |
| 9,411,410 B2* | 8/2016 | Noda | G06F 3/011 |
| 9,547,467 B1 | 1/2017 | DeLuca et al. | |
| 9,552,187 B2 | 1/2017 | Stahl et al. | |
| 9,787,958 B2* | 10/2017 | Hattingh | H04N 9/3185 |
| 9,916,813 B2* | 3/2018 | Jin | G09G 5/14 |
| 9,984,661 B2* | 5/2018 | Jin | G09G 5/00 |
| 10,063,822 B2* | 8/2018 | Hattingh | H04N 9/3185 |
| 10,068,373 B2* | 9/2018 | Lee | G06F 3/0488 |
| 2001/0048413 A1 | 12/2001 | Tabata | |
| 2003/0151562 A1* | 8/2003 | Kulas | G06F 3/1446 345/1.1 |
| 2004/0150581 A1 | 8/2004 | Westerinen et al. | |
| 2005/0264857 A1 | 12/2005 | Vesely et al. | |
| 2007/0097609 A1 | 5/2007 | Moscovitch | |
| 2007/0211955 A1* | 9/2007 | Pan | G06T 3/0043 382/254 |
| 2008/0180467 A1 | 7/2008 | Jaynes et al. | |
| 2010/0064536 A1* | 3/2010 | Caskey | G06F 1/1616 33/303 |
| 2010/0328354 A1* | 12/2010 | Watson | G06F 3/1423 345/672 |
| 2010/0328447 A1* | 12/2010 | Watson | G06F 3/1446 348/135 |
| 2011/0109526 A1* | 5/2011 | Bauza | G06F 3/1446 345/1.3 |
| 2011/0109619 A1* | 5/2011 | Yoo | G06T 17/00 345/419 |
| 2012/0327139 A1 | 12/2012 | Margulis | |
| 2013/0093780 A1 | 4/2013 | Egan et al. | |
| 2013/0155096 A1* | 6/2013 | Legair-Bradley | G06F 3/1423 345/619 |
| 2013/0181901 A1* | 7/2013 | West | G09G 5/14 345/161 |
| 2014/0016041 A1* | 1/2014 | Kim | G03B 21/53 348/745 |
| 2014/0063392 A1 | 3/2014 | Gondo | |
| 2014/0118271 A1 | 5/2014 | Lee | |
| 2014/0122911 A1 | 5/2014 | Gunn | |
| 2014/0184727 A1* | 7/2014 | Xiao | H04N 7/15 348/14.07 |
| 2014/0313190 A1* | 10/2014 | Vesely | G06T 15/20 345/419 |
| 2015/0286457 A1* | 10/2015 | Kim | G06F 3/1446 345/581 |
| 2015/0287158 A1* | 10/2015 | Cerny | G06F 3/013 345/553 |
| 2015/0302633 A1* | 10/2015 | Li | G06T 15/10 345/419 |
| 2015/0324002 A1 | 11/2015 | Quiet et al. | |
| 2016/0005229 A1* | 1/2016 | Lee | G06F 3/0488 345/419 |
| 2016/0080710 A1* | 3/2016 | Hattingh | H04N 9/3185 348/52 |
| 2016/0132991 A1* | 5/2016 | Fukushi | A63F 13/5255 345/667 |
| 2016/0180812 A1 | 6/2016 | Choi et al. | |
| 2016/0246170 A1 | 8/2016 | Bowen et al. | |
| 2016/0379600 A1* | 12/2016 | Jin | G09G 5/14 345/667 |
| 2016/0379601 A1* | 12/2016 | Jin | G09G 5/00 345/667 |
| 2017/0013253 A1* | 1/2017 | Huber | H04N 21/4316 |
| 2017/0013254 A1* | 1/2017 | Andersson | H04N 21/4316 |
| 2017/0372516 A1* | 12/2017 | Evans | G06T 19/006 |
| 2018/0047129 A1* | 2/2018 | Cerny | G06F 3/013 |
| 2018/0124314 A1* | 5/2018 | Baek | H04N 5/23238 |
| 2018/0143796 A1* | 5/2018 | Murakawa | G06F 3/017 |
| 2018/0190388 A1* | 7/2018 | Mezrich | G06F 3/0487 |
| 2018/0322683 A1 | 11/2018 | Dimitrov et al. | |

OTHER PUBLICATIONS

Humphreys et al., "A Distributed Graphics System for Large Titled Displays", Computer Science Department Stanford University, 1999, IEEE.

* cited by examiner

METHOD AND APPARATUS FOR RENDERING PERSPECTIVE-CORRECT IMAGES FOR A TILTED MULTI-DISPLAY ENVIRONMENT

CROSS-REFERENCE TO RELATED APPLICATIONS

This application claims the benefit of and priority to the provisional patent application Ser. No. 62/502,332, entitled "METHOD AND APPARATUS FOR RENDERING PERSPECTIVE-CORRECT IMAGES FOR A TILTED MULTI-DISPLAY ENVIRONMENT," with filing date May 5, 2017, and hereby incorporated by reference in its entirety.

This application is related to copending patent application, Ser. No. 15/652,116, filed on Jul. 17, 2017, entitled "METHOD AND APPARATUS FOR RENDERING PERSPECTIVE-CORRECT IMAGES FOR A TILTED MULTI-DISPLAY ENVIRONMENT," which is hereby incorporated by reference in its entirety.

FIELD

Embodiments of the present invention generally relate to the field of computer graphics. More specifically, embodiments of the present invention relate to systems and methods for rendering images for display on multiple tilted displays.

BACKGROUND

There is a growing need, in the field of computer graphics, to render graphics on multiple displays concurrently without introducing perspective distortion. Perspective distortion is a well-known problem in the field of computer graphics, where portions of an image near the edges of the image may appear stretched or blurred. The problem is especially relevant to the fields of computer gaming and simulated 3D environments.

For traditional, single display environments, rendering is free of perspective distortion from a single point of view. When rendering to wider field of view, for example, when multiple monitors are arranged horizontally (e.g., side-by-side), perception of perspective distortion is greatly amplified. In this case, the images displayed on the peripheral monitors are significantly distorted, potentially creating an unsatisfying and disorienting user experience. The image distortion is typically most severe toward the outside edges of the display. Furthermore, the side monitors bring diminishingly wider FOV due to the geometry of the scene (see FIG. 8).

Some existing solutions to perspective distortion when rendering images for multiple displays involve using a discreet graphics processing unit (GPU) for each display. However, this solution greatly increases end-user hardware costs, and ultimately relies on software developers to support multiple GPUs operating concurrently.

Furthermore, to enhance the user experience and sense of immersion when using multiple displays, many users have begun tilting the outer displays of a multiple display system inward toward the user, thereby creating a series of displays that slightly curves or wraps around the user, similar to the windows of an airplane cockpit. However, tilting the displays in this way further exacerbates the problem of perspective distortion because the user's perspective relative to the tilted display has changed compared to the traditional configuration, and the traditional rendering system is unable to correct the rendered images to accommodate the new perspective of the user relative to the peripheral displays.

What is needed is a technique for efficiently rendering images on multiple tilted displays concurrently that mitigates perspective distortion of multiple displays.

SUMMARY

A method and apparatus for rendering perspective-correct images for a tilted multi-display environment are disclosed herein. Embodiments of the present invention enable rendering 3D environments using multiple displays without introducing image distortion even when the peripheral displays are positioned at an angle relative to the central monitor.

According to one embodiment, a method of generating a multi-screen rendering for a titled multi-monitor display system is disclosed. The method includes assigning viewports to a center monitor, a first peripheral monitor, and a second peripheral monitor based on a location and orientation of a virtual camera, wherein the first peripheral monitor and the second peripheral monitor are tilted at an angle relative to the center monitor, and wherein the viewports are defined within a common plane that is perpendicular to a direction of view of said virtual camera, determining scene data for the viewports, generating geometric primitives for the viewports based on the scene data for the center monitor, the first peripheral monitor, and the second peripheral monitor using a single pass of a geometry engine, and performing image transformation on the geometric primitives using respective transformation engines for the center monitor, the first peripheral monitor, and the second peripheral monitor. The image transformation is based on the angle relative to the center monitor and a distance between the virtual camera and the plane, where the image transformation outputs geometric primitives with modified geometry to prevent image distortion of geometric primitives rendered on the first peripheral monitor and the second peripheral monitor. The method also includes rasterizing the geometric primitives using the modified geometry.

According to another embodiment, a method of generating a multi-screen rendering is disclosed. The method includes, with respect to a three dimensional represented space comprising three dimensional defined objects therein, using a single pass of a geometry engine of a graphics processor to generate a projection, in 2 dimensions, of the space as viewed from a camera on multiple viewports, the multiple viewports defined within a common plane that is perpendicular to a direction of view of the camera and where the common plane is located a distance, D, from the camera, the geometry engine outputting triangles corresponding to tilted viewports of the multiple viewports to respective triangle transformation engines where triangles corresponding to each tilted viewport are send to a corresponding triangle transformation engine, where each respective triangle transformation engine adjusts input triangles based on: 1) a tilt angle of a corresponding viewport; 2) the distance D; and 3) a location in 3D space of the corresponding viewport to generate output corrected triangles that are perspective corrected for each tilted viewport, outputting corrected triangles from the triangle transformation engines to a rasterizer for generating a frame buffer bitmap for each viewport of the multiple viewport, and rendering frame buffers from the rasterizer onto the multiple viewports.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
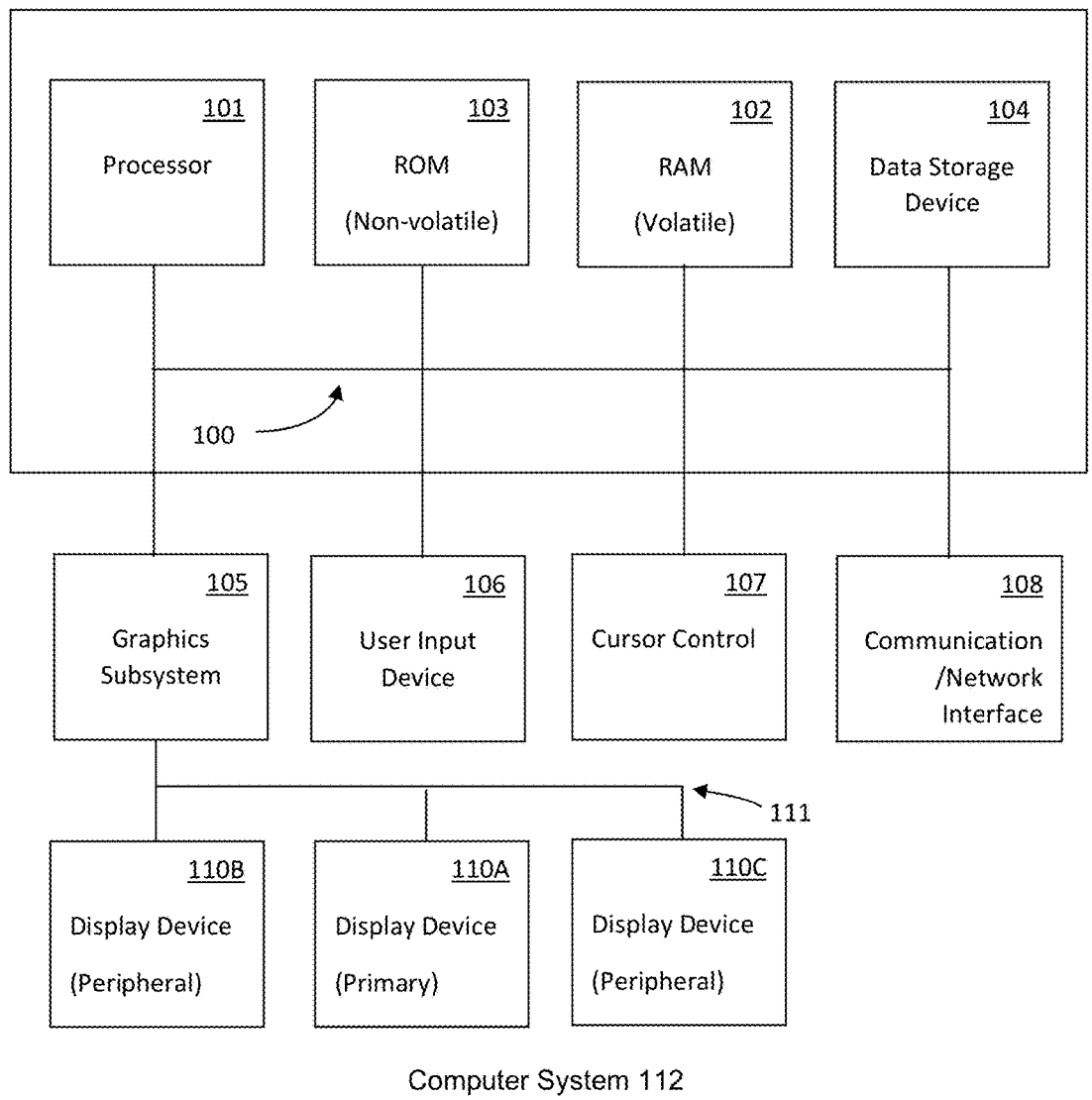
FIG. 1 is a block diagram of an exemplary computer system for rendering images on multiple tilted displays concurrently to mitigate perspective distortion according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 9 and 11) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Embodiments of the present invention are drawn computer systems for rendering images on multiple tilted displays concurrently to mitigate perspective distortion. The following discussion describes one such exemplary computer system.

In the example of FIG. 1, the exemplary computer system 112 includes a central processing unit (CPU) 101 for running software applications and optionally an operating system. Random access memory 102 and read-only memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user inputs 106 and 107 comprise devices that communicate inputs from one or more users to the computer system 112 (e.g., mice, joysticks, cameras, touch screens, and/or microphones).

A communication or network interface 108 allows the computer system 112 to communicate with other computer systems, networks, or devices via an electronic communications network, including wired and/or wireless communication and including an Intranet or the Internet. The primary display device 110A may be any device capable of displaying visual information in response to a signal from the computer system 112 and may include a flat panel touch sensitive display, for example. The components of the computer system 112, including the CPU 101, memory 102/103, data storage 104, user input devices 106, and graphics subsystem 105 may be coupled via one or more data buses 100.

In the embodiment of FIG. 1, a graphics sub-system 105 may be coupled with the data bus and the components of the computer system 112. The graphics system may comprise a physical graphics processing unit (GPU) 105 and graphics/video memory. GPU 105 may include one or more rasterizers, transformation engines, and geometry engines, and generates pixel data from rendering commands to create output images. The physical GPU 105 can be configured as multiple virtual GPUs that may be used in parallel (e.g., concurrently) by a number of applications or processes executing in parallel, or multiple physical GPUs may be used simultaneously.

Graphics sub-system 105 outputs display data to display devices 110A, 110B, and 110C. According to some embodiments, display device 110A is configured to operate as a central, primary display, and display devices 110B and 110C are configures to operate as peripheral (e.g., side) displays. The display devices may be communicatively coupled to the graphics subsystem 105 using HDMI, DVI, DisplayPort, VGA, etc.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Exemplary Rendered Environment Projected onto Two-Dimensional Surface

Figure 2:
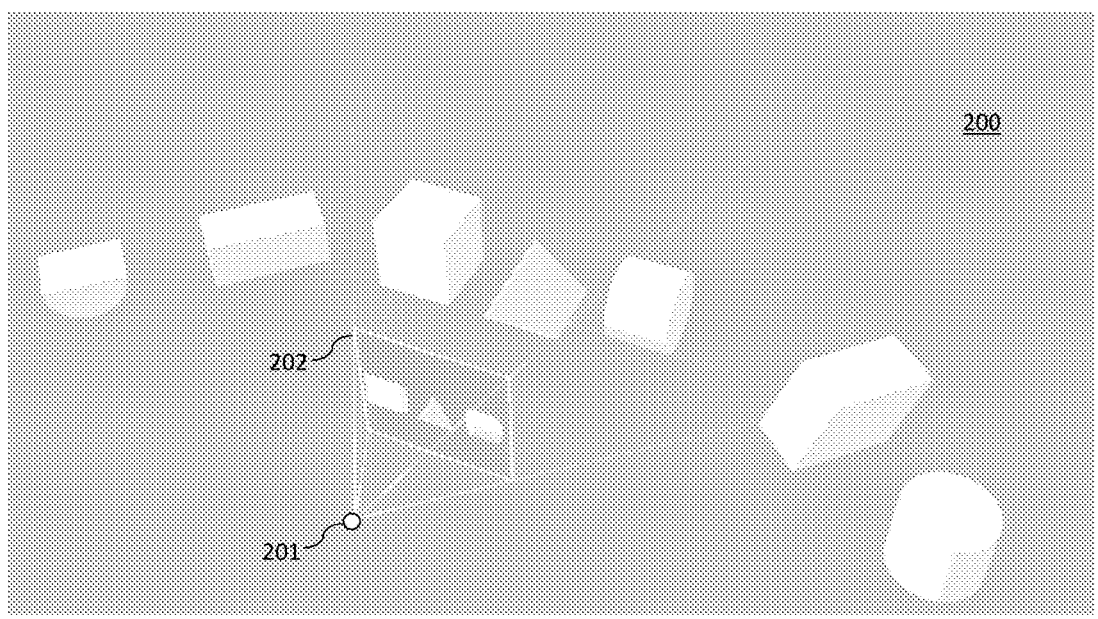
FIG. 2 is a diagram of an exemplary rendered environment generated using traditional 3D rendering techniques.

With regard to FIG. 2, an exemplary rendered environment 200 is generated using traditional rendering techniques. Projection or projection window 202 or "viewport" represents the rendered environment 200 projected onto a two-dimensional surface, such as a computer display screen as viewed from 201. The rendering computer system transforms the rendered environment 200 into a two-dimensional representation from the perspective of viewer 201. Objects outside of the field of view of viewer 201 are not represented in projection 202. Projection is therefore the mapping of a 3D virtual space onto a 2D plane as viewed from an observation point and direction.

Figure 3:
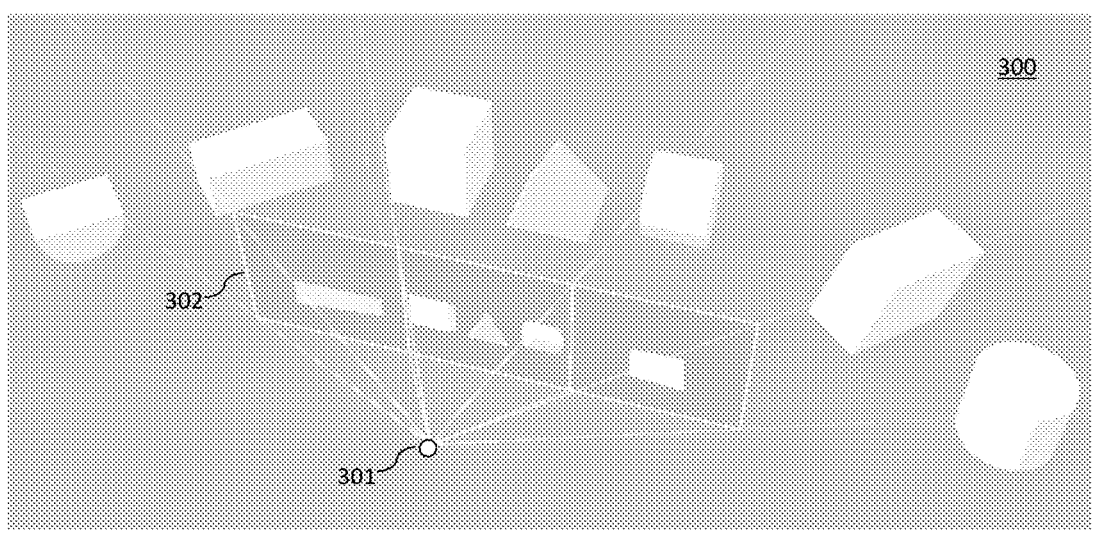
FIG. 3 is a diagram of an exemplary rendered environment generated using traditional 3D rendering techniques, where the outer displays exhibit perspective distortion.

With regard to FIG. 3, an exemplary rendered environment 300 is generated using traditional rendering techniques. Projection 302 or "viewport" represents the rendered environment 300 projected onto a two-dimensional surface including multiple display screens within a same plane. Specifically, projection 302 is rendered on three distinct displays: a central display and two peripheral displays on either side of the central display. The rendering computer system transforms the rendered environment 300 into a two-dimensional representation from the perspective of viewer 301 via projection. Due to the wide field of view, when objects of rendered environment 300 are projected onto the two-dimension display screens, the images displayed by the peripheral monitors can be significantly distorted.

Figure 4:
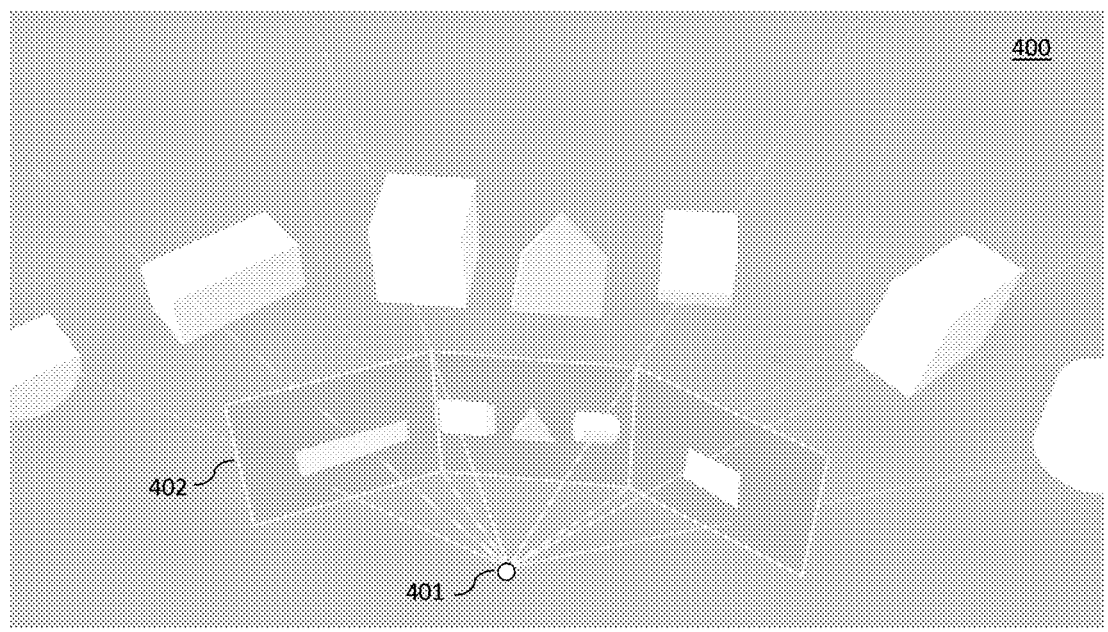
FIG. 4 is a diagram of an exemplary rendered environment generated using traditional 3D rendering techniques for multiple tilted displays, where the outer displays exhibit significant image distortion.

With regard to FIG. 4, an exemplary rendered environment 400 is generated using traditional rendering techniques, but the peripheral displays are tilted inward at the extreme edges. Projection 402 represents the rendered environment 400 projected onto a two-dimensional surface including multiple display screens or "viewports". Specifically, projection 402 includes three distinct displays: a central display and two peripheral displays, where the outside edges of the peripheral displays are moved closer (e.g., tilted) towards the user. The rendering computer system transforms the rendered environment 400 into a two-dimensional representation from the perspective of viewer 401. Due to the wide field of view and the title angle of the peripheral display screens, when objects of rendered environment 400 are projected onto the two-dimension display screens, the images displayed by the peripheral monitors are greatly distorted because the images of 402 are typically rendered as if the displays were not tilted inwards.

Figure 5:
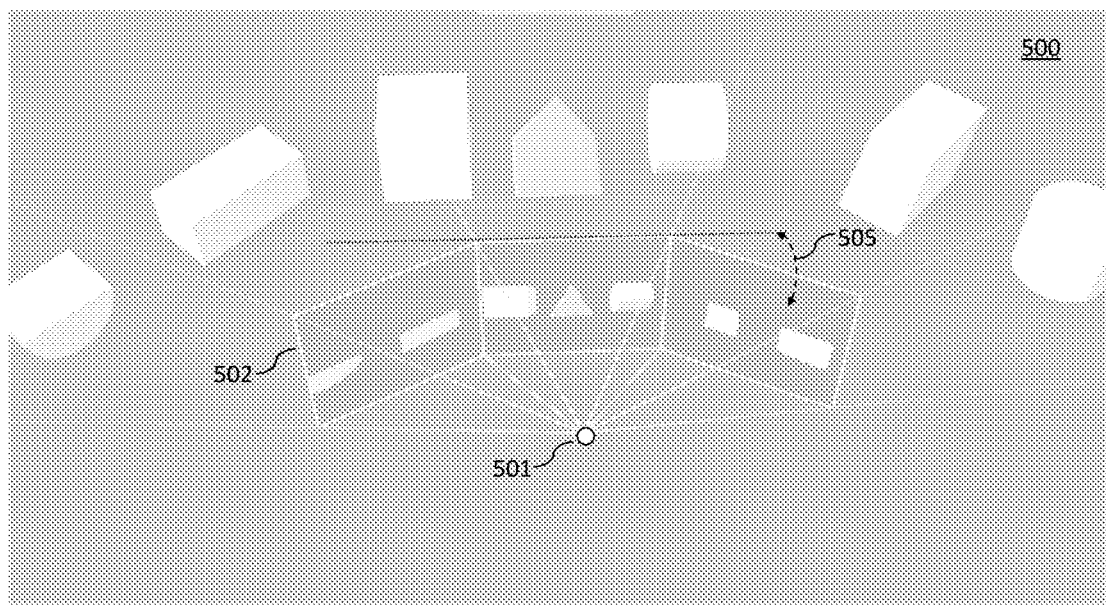
FIG. 5 is a diagram of an exemplary rendered environment depicted according to embodiments of the present invention, where the significant image distortion depicted in FIG. 4 has been corrected.

With regard to FIG. 5, an exemplary rendered environment 500 is depicted according to embodiments of the present invention, where the distortion of FIG. 4 is corrected in accordance with the tilt angle 505. Projection 502 represents the rendered environment 500 projected onto a two-dimensional surface including multiple display screens. Specifically, projection 502 includes three distinct displays: a central display and two peripheral displays, where the outside edges of the peripheral displays are moved closer (e.g., tilted) towards the user at a tilt angle 505. The rendering computer system transforms the rendered environment 500 into a two-dimensional representation from the perspective of viewer 501. As depicted in FIG. 5, embodiments of the present invention mitigate the image distortion to produce a perspective-correct image on the central and peripheral displays, even considering the tilt angle.

Figure 6A:
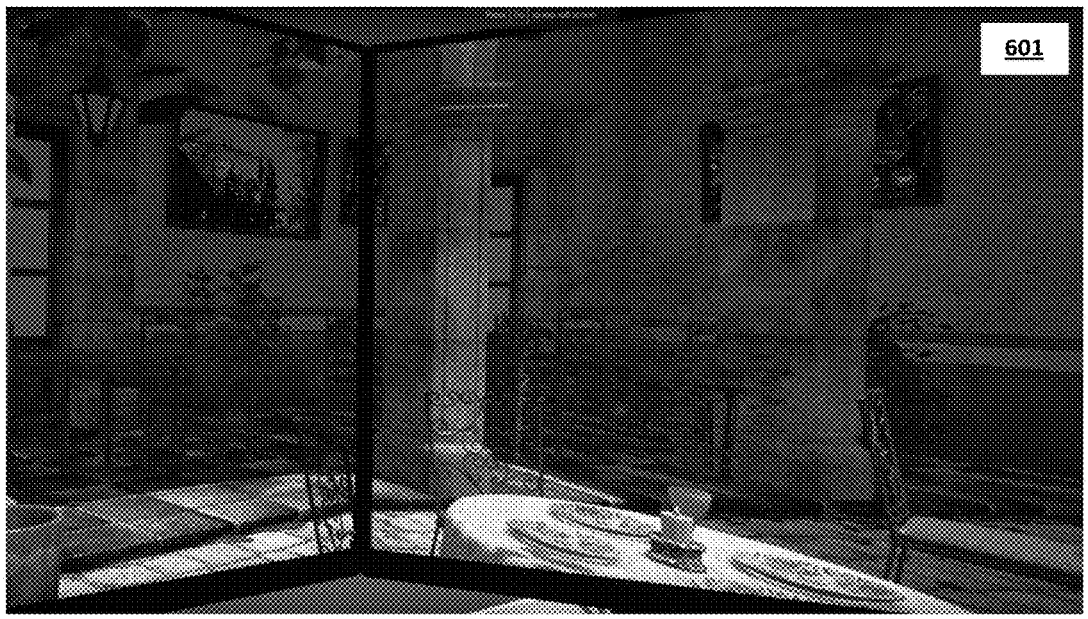
FIG. 6A depicts a distorted image of a peripheral display generated using traditional rendering techniques.
Figure 6B:
FIG. 6B depicts an image based on the distorted image depicted in FIG. 6A that has been corrected according to embodiments of the present invention.

With regard to FIG. 6A, an uncorrected image 601 of a peripheral display is depicted using traditional rendering techniques. As depicted, the content of uncorrected image 601 is stretched horizontally, such that circular objects appear elongated, and objects near edges of image 601 appear larger than objects located near the center of the image 601. As the camera pans and/or rotates, the distortion is even more noticeable because objects tend to change size and/or position and the field of view of the camera changes. FIG. 6B shows a corrected image 602 of a peripheral display depicted according to embodiments of the present invention. In the corrected image 602, the circular tables appear round without being elongated, and the size and position of objects in the scene are rendered accurately and consistently, regardless of the position and orientation of the camera.

Figure 7A:
FIG. 7A depicts a distorted image of a peripheral display generated using traditional rendering techniques.
Figure 7B:
FIG. 7B depicts an image based on the distorted image depicted in FIG. 7A that has been corrected according to embodiments of the present invention.

With regard to FIG. 7A, an uncorrected image 701 of a peripheral display is depicted using traditional rendering techniques. FIG. 7B depicts a corrected image of a peripheral display according to embodiments of the present invention. The corrected image 702 of FIG. 7B is based on the uncorrected image 701. Because the perspective used to render image 701 is unfit for multi-display rendering with tilted peripheral displays, portions of the field of view of the camera are not rendered, such as the stone archway and the table near the left of the image, and the portions of the field of view of the camera that are rendered are severely distorted. For example, the column near the left side of the screen (near an outer edge of multi-display arrangement) appears much larger than the column near the right side of the screen (near the center of the multi-display arrangement).

Figure 8:
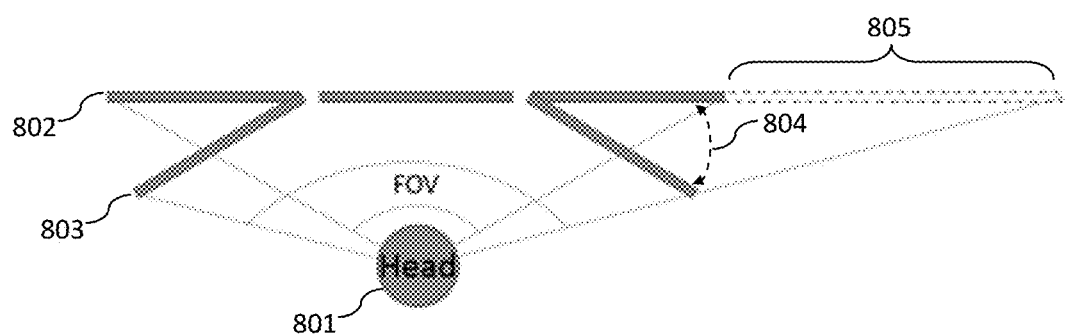
FIG. 8 depicts exemplary multi-display configurations according to embodiments of the present invention, where the field of view of a multi-display configuration is extended by tilting the peripheral monitors.

With regard to FIG. 8, exemplary multi-display configurations are depicted. A first series of displays 802 is arranged in a side-by-side configuration, where the displays are positioned along a common plane without tilt. A second series of displays 803 is arranged in a tilted configuration, where the angle 804 between the center display and the peripheral displays may be adjusted according to viewer preference. From the perspective of the viewer 801, the expected field of view (FOV) of the tilted configuration is much larger than the expected field of view of the side-by-side configuration. The increased field of view on the right (805) and left (not pictured) peripheral displays allows a user to see more of the environment at once and can be used to provide a more immersive experience, without distorting the image or impacting image quality, according to embodiments of the present invention.

Figure 9:
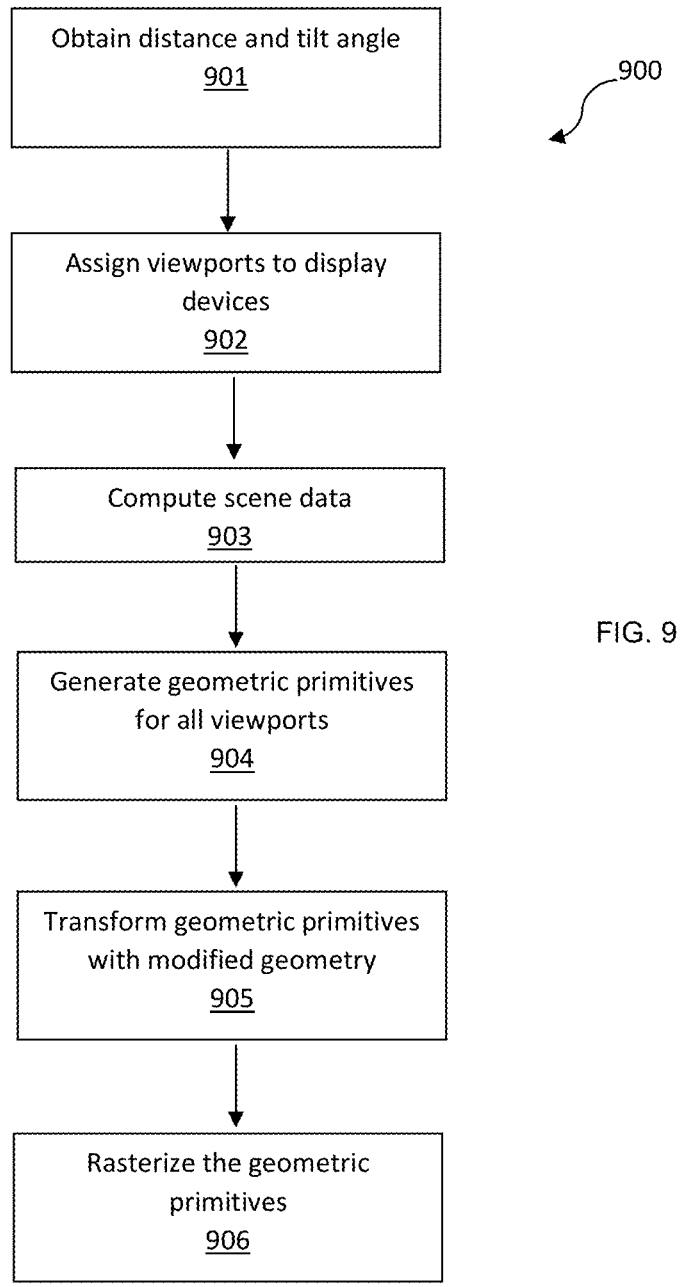
FIG. 9 depicts a flowchart illustrating an exemplary sequence of computer implemented steps for rendering a perspective-correct image across multiple tilted displays using geometry-based surround rendering according to embodiments of the present invention.

Rendering a Perspective-Correct Image Across Multiple Tilted Displays Using Geometry-Based Surround Rendering With regard to FIG. 9, a flowchart depicting an exemplary sequence of computer implemented steps 900 for rendering a perspective-correct image across multiple tilted displays using geometry-based surround rendering is depicted according to embodiments of the present invention. At step 901, a distance to the central display 1006 and a tilt angle of the peripheral displays 1005 and 1007 are obtained. At step 902, viewports are assigned to the plurality of display devices. According to some embodiments, the viewports are determined based on a location and orientation of a virtual camera and are defined within a common plane. The camera view angle is used to compute scene data at step 903.

Figure 10:
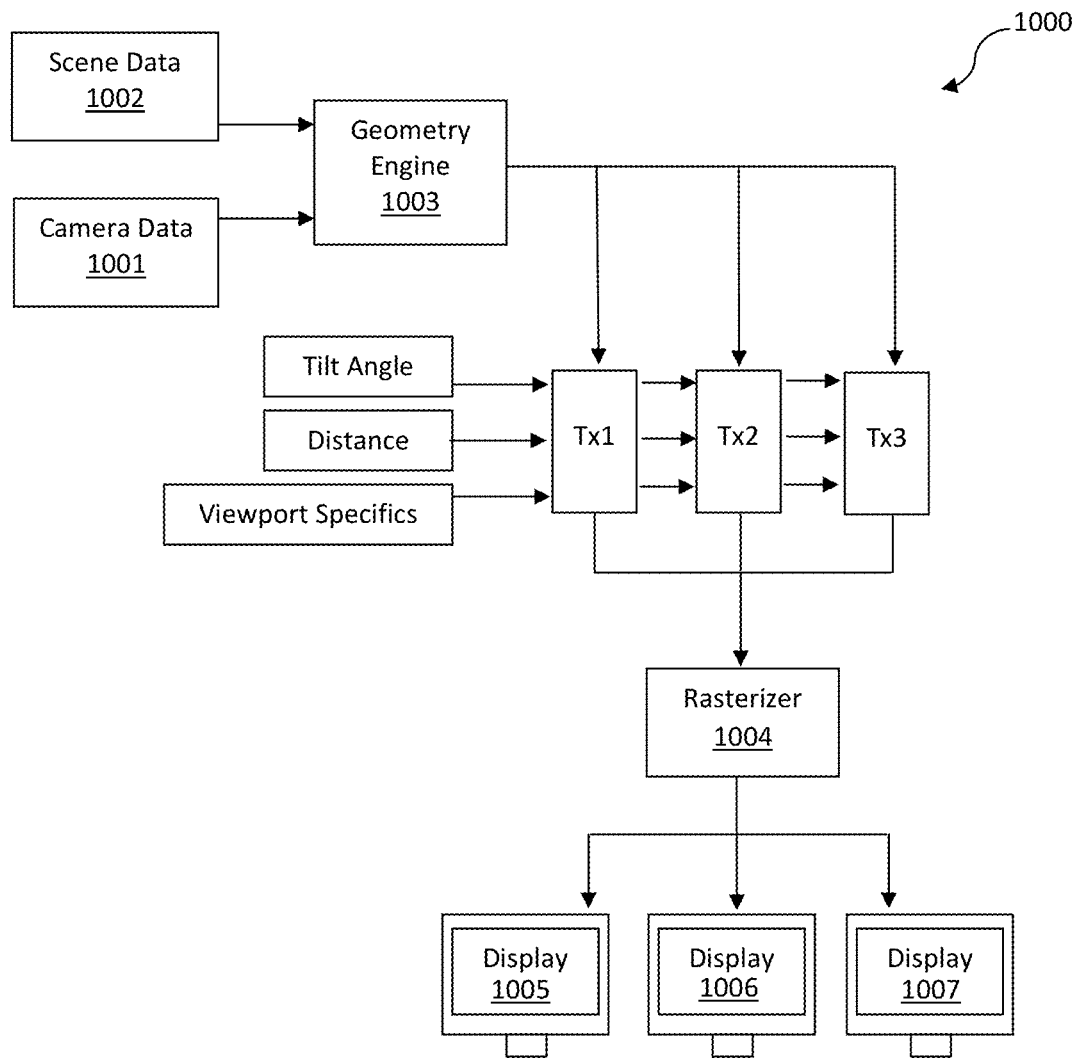
FIG. 10 depicts an exemplary data flow diagram for rendering a perspective-correct image across multiple tilted displays using geometry-based surround rendering according to embodiments of the present invention.

FIG. 10 depicts an exemplary block diagram and data flow diagram 1000 for rendering a perspective-correct image across multiple tilted displays 1005, 1006, and 1007 using geometry-based surround rendering according to embodiments of the present invention. With reference to FIG. 9 and FIG. 10, camera/projection data 1001 and the 3D scene data 1002 are both fed to a geometry engine 1003. Geometry engine operates in a single pass to compute primitives for the viewports. The geometry engine applies transformations (e.g., vertex shading, tessellation, etc.) and generates the outputs for all viewports at step 904. The geometric primitives (e.g., triangles/polygons) generated by the geometry engine are passed to three different transformation engines (e.g., a triangle transformation engines) Tx1, Tx2, and Tx3, one for each screen in the multiple screen arrangement.

Each respective transformation engine takes as input the tilt angle of its associated screen, the distance between the camera, and the virtual screen and the dimensions and location of the screen (e.g., viewport data), as well as computed coefficients A, B, offset x, scale x offset y, scale y, plus scale and offset for z. The computed coefficients are determined based on the viewport data, and the transformation engines output primitives (e.g., triangles/polygons) having vertices of actual screen locations at step 905. According to some embodiments, A and B are computed based on the angle relative to the center monitor and a distance between a user and the center monitor. The primitives are rasterized to create the frame buffer image for the associated screen at step 906 using rasterizer 1004. In this embodiment, full image quality is maintained.

The output of an exemplary geometry engine 1003 may be represented as a value set (X, Y, Z, W), where W represents a perspective value (e.g., a distance from a virtual camera). An exemplary triangle transformation engine $Tx_n$ performs the following calculations to compute a new perspective value W':

$$W'=AX+BY+W$$

The computed perspective value W' is used to perform perspective divide on vertices to generate normalized screen coordinates X', Y', and Z'.

$$X'=X/W'$$

$$Y'=Y/W'$$

$$Z'=Z/W'$$

The geometry is then modified prior to rasterization to determine actual screen coordinates X", Y", and Z" in window space using a scale multiplier and an offset value.

$$X''=X'*\text{scale } x+\text{offset } x$$

$$Y''=Y'*\text{scale } y+\text{offset } y$$

$$Z''=Z'*\text{scale } z+\text{offset } z$$

These results are fed to a rasterizer 1004 for each viewport n and ultimately rendered to a frame buffer for each viewport.

Figure 11:
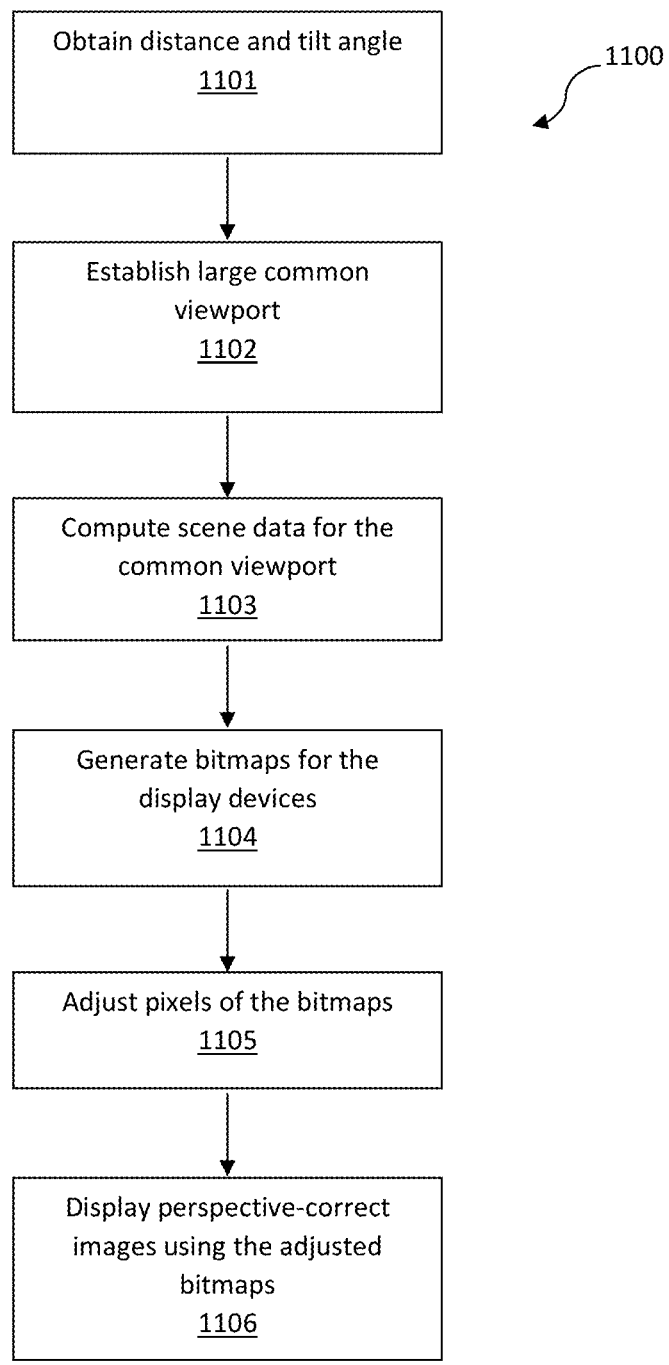
FIG. 11 depicts a flowchart illustrating an exemplary sequence of computer implemented steps for rendering a perspective-correct image across multiple tilted displays using screen-based surround rendering according to embodiments of the present invention.

Rendering a Perspective-Correct Image Across Multiple Tilted Displays Using Screen-Based Surround Rendering With regard to FIG. 11, a flowchart depicting an exemplary sequence of computer implemented steps 1100 for rendering a perspective-correct image across multiple tilted displays using screen-based surround rendering is depicted according to embodiments of the present invention. A single pass through the geometry engine is used for the screens. The output of the geometry engine is directly fed into a rasterizer that rasterizes the triangles (for all screen) as if they were located on a virtual flat screen (e.g., all viewports lie within a common plane. A single pass through the geometry engine is used for the screens. In order to provide the proper perspective, the images (e.g., bitmaps) associated with the tilted screens are adjusted (pixel by pixel) by transformation engines at the pixel level for proper perspective to the camera based on the tilts of the screens. This technique compresses the data and may lead to degraded image quality.

Figure 12:
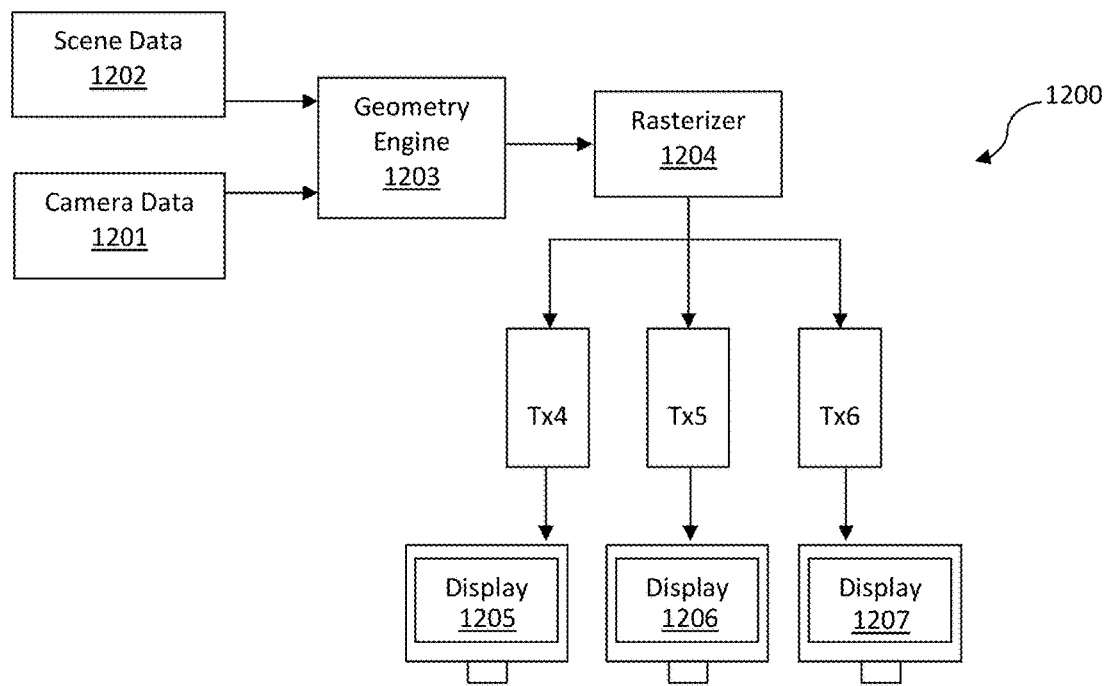
FIG. 12 depicts an exemplary data flow diagram for rendering a perspective-correct image across multiple tilted displays using screen-based surround rendering according to embodiments of the present invention.

FIG. 12 depicts an exemplary block diagram and data flow diagram 1200 for rendering a perspective-correct image across multiple tilted displays using screen-based surround rendering according to embodiments of the present invention. With reference to FIG. 11 and FIG. 12, one exemplary method for rendering a perspective-correct image across multiple tilted displays using screen-based surround rendering begins at step 1101 by obtaining to a distance to the central display 1206 and a tilt angle of the peripheral displays 1205 and 1207. A large common viewport that encapsulates all final geometry in the scene is established for the display devices 1205, 1206, and 1207 at step 1102. Scene data for the common viewport is computed at step 1103, and the scene data 1202 and camera data 1201 are both fed to a geometry engine 1203. The geometry engine 1203 applies transformations (e.g., vertex shading, tessellation, etc.) and outputs geometric primitives (e.g., triangles/polygons) to rasterizer 1204 using a single pass. At step 1104, rasterizer 1204 rasterizes the primitives for all screen as if they were located on a virtual flat screen. At step 1105, three distinct transformation engines (e.g., triangle transformation engines) Tx4, Tx5, and Tx6 are used to adjust (e.g., warp or crop) the bitmaps using image-space processing to provide a proper perspective to the camera based on the tilt of the peripheral screens. Rather than displaying the rendered (distorted) image directly, the image is projected onto a virtual plane that is tilted relative to the tilt of the peripheral displays 1205 and 1207. The image is warped and/or cropped as necessary to correct perspective distortion. The virtual flat image plane is located "behind" the physical, tilted monitor configuration, and is used as a texture viewed in perspective from a virtual camera. The virtual camera represents the actual user's position relative to the central display 1206.

According to some embodiments, portions of the bitmaps that lie outside of the FOV of the camera may be discarded before rendering. According to some embodiments, each display uses a dedicated transformation engine to render perspective corrected images for the respective display. At step 1106, perspective-correct images are displayed on the display devices using the adjusted bitmaps.

Mathematical Derivation of Modified Perspective Value Based on Tilt Angle

Figure 13:
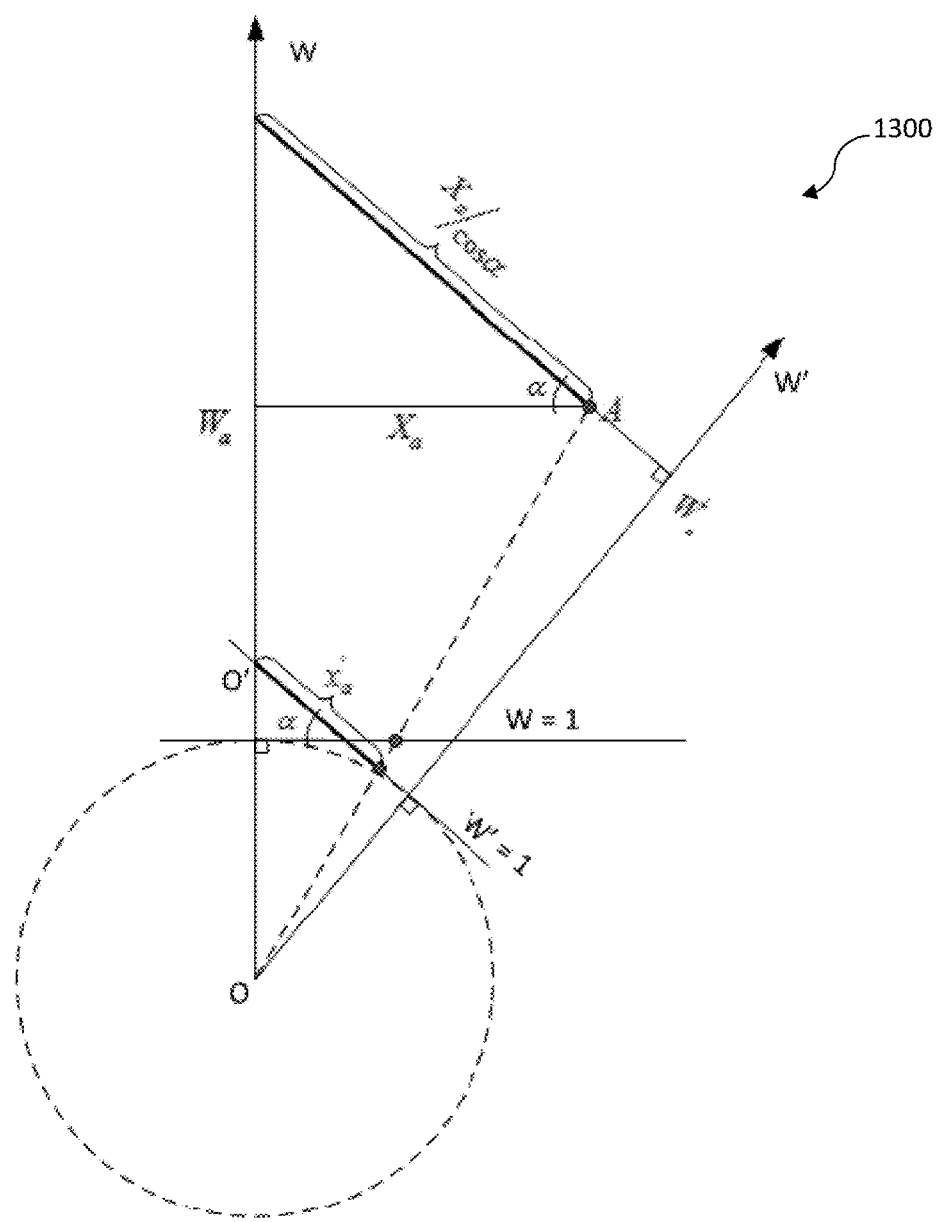
FIG. 13 depicts a diagram for determining a modified perspective value for rendering to multiple tilted displays based on a tilt angle according to embodiments of the present invention.

With regard to FIG. 13, a diagram 1300 for determining a modified perspective value for rendering to multiple tilted displays based on a tilt angle is depicted according to embodiments of the present invention. The projection (X'a, W'a) of a point a in the coordinate space of the right peripheral (tilted) monitor is determined. For convenience, the transformation may be derived at the tilted coordinate system having X'=0 at point O', and viewport transformation is used to translate into the correct space.

$$\frac{w'_a}{1} = \frac{\frac{X_a}{\cos\alpha}}{x'_a} \rightarrow x'_a = \frac{\frac{X_a}{\cos\alpha}}{W'_a} = \frac{X_a}{W'_a} \cdot \sec\alpha$$

$$W'_a = W_a \cdot \cos\alpha + X_a \cdot \sin\alpha = (W_a + X_a \cdot \tan\alpha) \cdot \cos\alpha$$

$$x'_a = \frac{X_a}{(W_a + X_a \cdot \tan\alpha) \cdot \cos\alpha} \cdot \sec\alpha = \frac{X_a}{W_a + X_a \cdot \tan\alpha} \cdot \sec^2\alpha$$

$$y'_a = \frac{Y_a}{(W_a + X_a \cdot \tan\alpha) \cdot \cos\alpha} \cdot \sec\alpha$$

$$z'_a = \frac{Z_a}{(W_a + X_a \cdot \tan\alpha) \cdot \cos\alpha} \cdot \sec\alpha$$

The above expresses the coordinates of A in the new coordinate system, which is shifted horizontally with respect to the right peripheral monitor. The GPU, for example, can compute the denominator in hardware, while the sec α and sec² α scalers in the nominator and horizontal offset can also be computed in hardware by configuring the viewport scale and offset accordingly. Using a viewport equation in the above formula yields:

Left viewport $$x'_0 = \frac{width}{6} \cdot \left[(\tan\alpha - \sec^2\alpha) \cdot \cot\frac{\alpha}{2} + 1\right]$$

$$y'_0 = \frac{height}{2} \cdot (1 - \sec\alpha)$$

Right viewport $$x^r_0 = \frac{width}{6} \cdot \left[5 - (\tan\alpha + \sec^3\alpha) \cdot \cot\frac{\alpha}{2}\right]$$

$$y^r_0 = \frac{height}{2} \cdot (1 - \sec\alpha)$$

Center viewport $$x^c_0 = \frac{width}{6} \cdot \left[3 - \cot\frac{\alpha}{2}\right]$$

$$y^c_0 = 0$$

$$w^c = \frac{width}{3} \cdot \cot\frac{\alpha}{2}$$

$$h^c = height$$

By construction, the tilt angle between monitors is equal to the field of view towards each monitor and is denoted by α. According to some embodiments, software configures three viewports (one per monitor) as described above and sends primitives to all of them. The per-primitive VIEWPORT_MASK attribute should be set such that the viewports intersects with the primitive or 0b111. The attribute can be set in any VTG shader stage, though FastGS may be used when computing the actual overlaps.

Each viewport has a unique modified perspective coefficient as configured by the SetPositionWScaledOffset class method in GP10x processor type and later. As derived above, the Y scale factors may be set to zero, while the X scale factors may be set to {tan(α), 0, tan(α)} for the 3 viewports, respectively.

Before multiplying the screen pixel by the inverse projection matrix, the screen pixel is unwarped. For small tilt angles, due to the fact that the geometry is effectively pushed farther away from the screen, deferred shading passes (such as blur, or ambient occlusion) may be used without creating objectionable artifacts.

Bezel compensation may be used for accurate projection when a bezel or frame of a display device creates a gap between pixels of adjacent displays. This can be accomplished in two ways:

1. The left and right viewports may be offset by changing the x min parameter in pixel space (~150 pixels for, for example). This is the fastest option, but may introduce discontinuities in the image, which may be a problem for deferred passes.
2. Enlarge all viewports, as if the monitors had pixels where the bezels meet. Render to that surface, but before displaying, remove the pixels that happen to be located at the bezels. This overdraws slightly, but creates an uninterrupted image.

Calibration Tool for Setting Modified Perspective Value Based on Tilt Angle and Distance to Viewer A calibration stage may be used to determine the tilt angle and distance between the user and the screen. The user is shown a grid image across the display screens of the multi-display arrangement. The user can adjust sliders that define tilt angle and distance until the grid appears straight to the user across all screens, with no broken or curved lines. These values will then be used to set the tilt angle and distance for rendering to the multi-display arrangement.

One exemplary method for performing calibration on multiple viewports to determine a distance value and a tilt angle according to embodiments of the present invention includes projecting a geometric pattern onto multiple viewports. User input is received to alter a correspondence to D to vary said D and to alter a correspondence to a tilt angle of a viewport to vary said tilt angle. An altered geometric pattern is re-projected onto the multiple viewports responsive to variations in said D and said tilt angle. These calibration steps are repeated until any observable geometric distortion is resolved. The determined distance and tilt angle values are saved responsive to a user calibration end input.

To produce perspective-correct images rendered on multiple tilted displays, the rendering system relies on the geometrical characteristics of the configuration (e.g., how the monitors are positioned relative to the viewer's position, and how the monitors are tilted). In the simplest case, when the tilt angle of side monitors is 0, the horizontal field of view (FOV) alone may be used to calculate the optimal position where the viewer should be placed to observe a geometrically correct image. The main purpose of the configuration tool is to increase total FOV without introducing distortion (e.g., a "fish eye" effect).

The exemplary calibration tool described herein provides a simple way to find required configuration parameters without introducing actual physical measurements. There are two parameters—normalized distance to the center monitor (e.g., horizontal field of view) and tilt angle of side monitors. The tilt angle can be tuned using a "Top view" visualization that greatly simplifies the tuning process and understanding of the parameters. This helps prevent unintentionally using very large or small values that would place a user too far away from the monitors, or too close to the center monitor, for example. The calibration tool provide several ways for reaching perspective correctness:
1. Distance (FOV) and tilt angle may be measured and entered directly
2. Parameters may be adjusted until the "top view" image looks similar to how the multi-display arrangement is actually configured.

A first person view visualization of the surrounding room can be used to ensure that there are no broken lines and the entire image looks seamless, especially during camera motion. FOV for the center monitor can be derived from the monitor size and the distance to the center monitor. If the monitor size is assumed to be 1 (no actual measurement), only a "generalized distance" may be used because, from the rendering point of view, the surround configuration is not sensitive to scale. According to some embodiments, a head tracking device or other positional tracking device may be used to detect a distance between the user and the center monitor.

Two different view modes may be used within the calibration tool, first person camera and fixed center wall camera.

First person camera: in this mode changing the distance to the center monitor doesn't lead to camera position changing so the camera is static. Visually the camera appears to move. Decreasing FOV in software shortens camera frustum while the actual FOV of the surround setup stays the same (assuming the head is not moving). As a result, less geometry is required to be rendered on the screen.

Fixed center wall camera: this mode keeps center wall static, and moves the camera along the axis perpendicular to the center monitor. This allows the user to concentrate mostly on side monitors. This mode demonstrates how the distance to the center monitor changes the "feeling" or "experience" of the tilt angle, and how different tilt angles affects the output image. This mode may be more convenient for games other than first person shooters.

Embodiments of the present invention are thus described. While the present invention has been described in particular embodiments, it should be appreciated that the present invention should not be construed as limited by such embodiments, but rather construed according to the following claims.

What is claimed is:

1. A method of generating a multi-screen rendering for a tilted multi-monitor display system, said method comprising:
assigning viewports to a center monitor, a first peripheral monitor, and a second peripheral monitor based on a location and orientation of a virtual camera, wherein the first peripheral monitor and the second peripheral monitor are tilted at an angle relative to the center monitor, and wherein the viewports are defined within a common plane that is perpendicular to a direction of view of said virtual camera;
determining scene data for the viewports;
generating geometric primitives for the viewports based on the scene data for the center monitor, the first peripheral monitor, and the second peripheral monitor using a single pass of a geometry engine;
performing image transformation on the geometric primitives using respective transformation engines for the center monitor, the first peripheral monitor, and the second peripheral monitor, wherein the image transformation is based on the angle relative to the center monitor and a distance between the virtual camera and the plane, and wherein the image transformation outputs geometric primitives with modified geometry to prevent image distortion of geometric primitives rendered on the first peripheral monitor and the second peripheral monitor; and
rasterizing the geometric primitives using the modified geometry.

2. The method as described in claim 1, wherein the geometric primitives comprise vertices in three-dimensional space represented by X, Y, and Z, and a perspective value represented by W, and wherein the transformation engines compute a new perspective value W' based on the formula W'=AX+BY+W.

3. The method as described in claim 2, wherein A and B are computed for the first peripheral monitor and the second peripheral monitor based on the angle relative to the center monitor and a distance between a user and the center monitor.

4. The method as described in claim 3, wherein W' is used to perform a perspective divide on the vertices to generate normalized screen coordinates represented by X', Y', and Z'.

5. The method as described in claim 4, wherein the transformation engines outputs modified geometry for the geometric primitives using the screen coordinates X", Y", and Z".

6. The method as described in claim 5, wherein the screen coordinates X", Y", and Z" are determined by multiplying the normalized screen coordinates by a scale value and adding an offset value.

7. The method as described in claim 6, wherein the scale value and the offset value are determined based on attributes of a respective viewport.

8. A method of generating a multi-screen rendering, said method comprising:
with respect to a three dimensional represented space comprising three dimensional defined objects therein, using a single pass of a geometry engine of a graphics processor to generate a projection, in 2 dimensions, of said space as viewed from a camera on multiple viewports, said multiple viewports defined within a common plane that is perpendicular to a direction of view of said camera and wherein said common plane is located a distance, D, from said camera;
said geometry engine outputting triangles corresponding to tilted viewports of said multiple viewports to respective triangle transformation engines wherein triangles corresponding to each tilted viewport are sent to a corresponding triangle transformation engine, wherein each respective triangle transformation engine adjusts input triangles based on: 1) a tilt angle of a corresponding viewport; 2) said distance D; and 3) a location in 3D space of said corresponding viewport to generate output corrected triangles that are perspective corrected for each tilted viewport;

outputting corrected triangles from said triangle transformation engines to a rasterizer for generating a frame buffer bitmap for each viewport of said multiple viewports; and rendering frame buffers from said rasterizer onto said multiple viewports.

9. A method as described in claim 8 wherein said geometry engine outputs triangles having vertices in the format: (X, Y, Z and W).

10. A method as described in claim 9 wherein a respective triangle transformation engine performs the following transformations on triangle vertices input thereto for a respective viewport:

$$W'=AX+BY+W$$

$$X'=X/W'$$

$$Y'=Y/W'$$

$$Z'=Z/W'$$

$$X''=X' \text{ scale } x+\text{offset } x$$

$$Y''=Y' \text{ scale } y+\text{offset } y,$$

wherein X" and Y" are viewport screen coordinates of said respective viewport, and A and B are based on a tilt angle of said respective viewport and D, and wherein scale x, offset x, scale y, and offset y are based on a location in said space of said respective viewport.

11. The method as described in claim 8 further comprising performing calibration on said multiple viewports to determine said D and any tilt angle of any viewport of said multiple viewports wherein said performing calibration comprises:

a) projecting a geometric pattern onto said multiple viewports;

b) receiving a user input to alter a correspondence to D to vary said D;

c) receive a user input to alter a correspondence to a tilt angle of a viewport to vary said tilt angle; and d) re-projecting an altered geometric pattern onto said multiple viewports responsive to variations in said D and said tilt angle;

e) repeating said b)-d); and f) capturing said D and said tilt angle responsive to a user calibration end input.

12. The method as described in claim 11, further comprising determining a field of view of a central display device based on said D and a size of said central display device.

13. The method as described in claim 11 wherein said D is input via a head tracking detector.

14. An apparatus for generating a multi-screen rendering for a tilted multi-monitor display system, said apparatus comprising:

a processor and memory configured to execute instructions of an application that renders three-dimensional environments; and a graphics processing unit communicatively coupled to the processor and the memory, wherein the graphics processing unit is configured to perform a method of generating a multi-screen rendering for the titled multi-monitor display system, said method comprising:

assigning viewports to a center monitor, a first peripheral monitor, and a second peripheral monitor based on a location and orientation of a virtual camera, wherein the first peripheral monitor and the second peripheral monitor are tilted at an angle relative to the center monitor, wherein the viewports are defined within a common plane that is perpendicular to a direction of view of said virtual camera, and wherein the center monitor, the first peripheral monitor, and the second peripheral monitor are communicatively coupled to the graphics processing unit;

determining scene data for the viewports;

generating geometric primitives for the viewports based on the scene data for the center monitor, the first peripheral monitor, and the second peripheral monitor using a single pass of a geometry engine;

performing image transformation on the geometric primitives using respective transformation engines for the center monitor, the first peripheral monitor, and the second peripheral monitor, wherein the image transformation is based on the angle relative to the center monitor and a distance between the virtual camera and the plane, and wherein the image transformation outputs geometric primitives with modified geometry to prevent image distortion of geometric primitives rendered on the first peripheral monitor and the second peripheral monitor; and rasterizing the geometric primitives using the modified geometry.

15. The apparatus as described in claim 14, wherein the geometric primitives comprise vertices in three-dimensional space represented by X, Y, and Z, and a perspective value represented by W, and wherein the transformation engines compute a new perspective value W' based on the formula W'=AX+BY+W.

16. The apparatus as described in claim 15, wherein A and B are computed for the first peripheral monitor and the second peripheral monitor based on the angle relative to the center monitor and a distance between a user and the center monitor.

17. The apparatus as described in claim 16, wherein W' is used to perform a perspective divide on the vertices to generate normalized screen coordinates represented by X', Y', and Z'.

18. The apparatus as described in claim 17, wherein the transformation engines outputs modified geometry for the geometric primitives using the screen coordinates X", Y", and Z".

19. The apparatus as described in claim 18, wherein the screen coordinates X", Y", and Z" are determined by multiplying the normalized screen coordinates by a scale value and adding an offset value.

20. The apparatus as described in claim 19, wherein the scale value and the offset value are determined based on attributes of a respective viewport.

* * * * *